J. C. McINTYRE.
ROTARY SCREEN.
APPLICATION FILED JUNE 18, 1913.
1,072,750.
Patented Sept. 9, 1913.
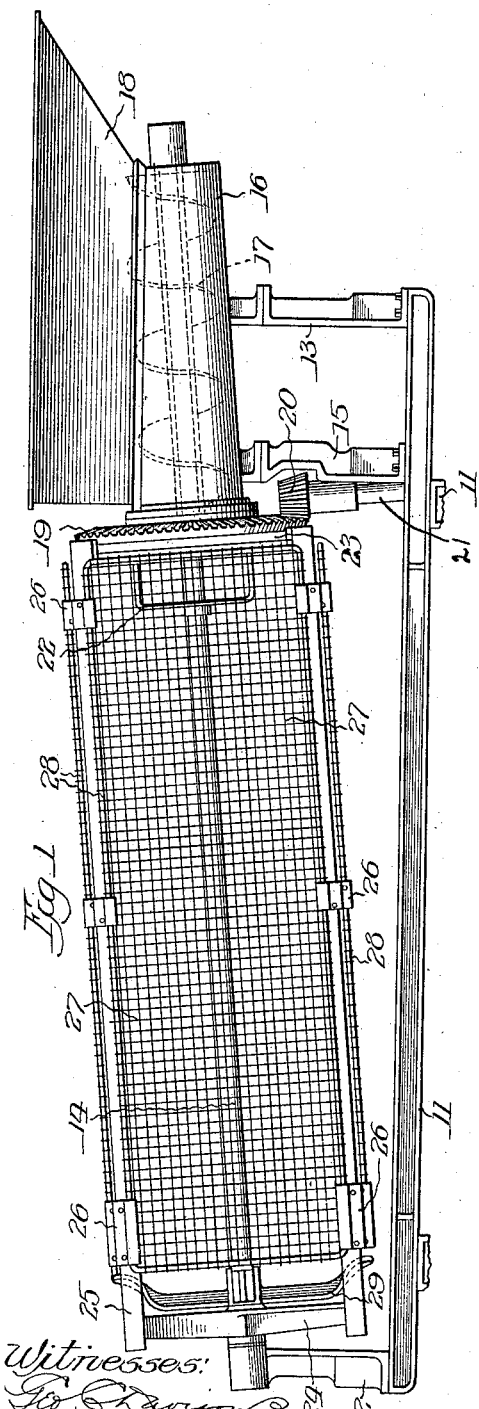
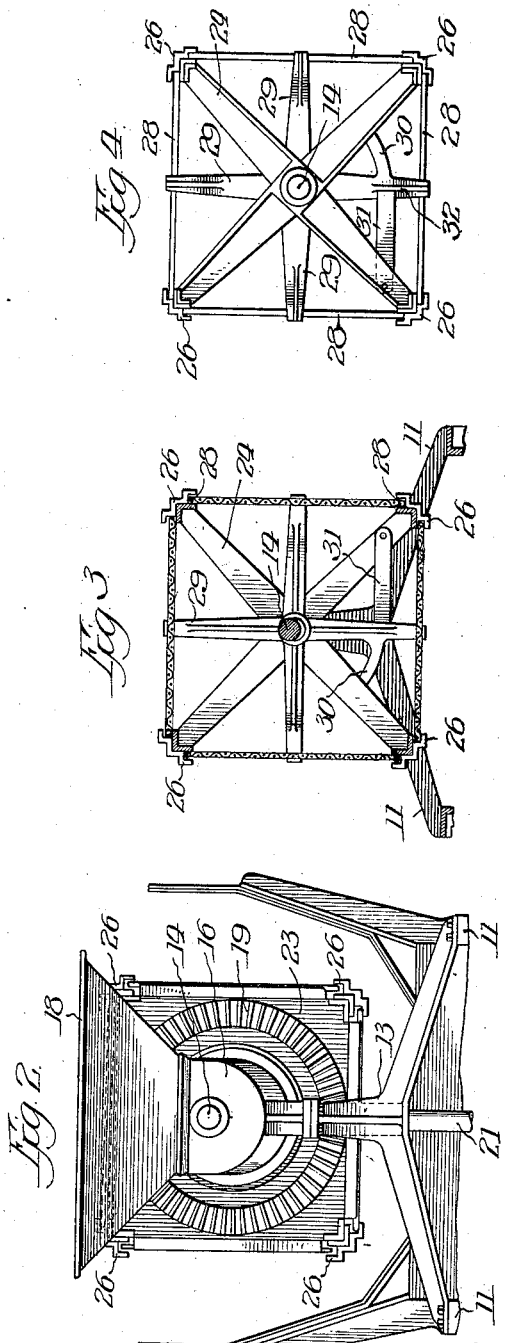

UNITED STATES PATENT OFFICE.

JOHN C. McINTYRE, OF HOOPESTON, ILLINOIS, ASSIGNOR TO SPRAGUE CANNING MACHINERY COMPANY, OF CHICAGO, ILLINOIS, A CORPORATION OF ILLINOIS.

ROTARY SCREEN.

1,072,750.

Specification of Letters Patent.

Patented Sept. 9, 1913.

Original application filed March 7, 1913, Serial No. 752,550. Divided and this application filed June 18, 1913. Serial No. 774,368.

*To all whom it may concern:*

Be it known that I, JOHN C. McINTYRE, a citizen of the United States, residing at Hoopeston, in the county of Vermilion and State of Illinois, have invented certain new and useful Improvements in Rotary Screens, of which the following is a specification.

This invention relates to machines for separating the silk and other debris from the kernels of green corn which have been cut from the cob.

As the corn comes from the machine by which it is cut from the ear in its green condition it is accompanied by a considerable amount of silk which was not removed in the husking operation and there are also small bits of cob and other foreign matter all of which must be separated from the corn before the latter can be prepared for canning or use.

The object of this invention is the provision of a machine for the removal of such foreign matter and particularly the silk, which machine shall have a maximum of efficiency and which can be quickly and thoroughly cleaned without intermitting its own operation or that of the cutting machines which supply the corn thereto.

In order that the invention and the manner of its operation may be readily understood I set forth in the accompanying drawings and in the description based thereon a preferred embodiment of the same, it being understood that the constructional features of the invention are capable of modification within a wide range and the drawing and description are for that reason to be construed in an illustrative sense and not as unnecessarily limiting the invention.

In the drawings: Figure 1 is a side elevation of the machine with certain of the parts broken away; Fig. 2 is a front end elevation; Fig. 3 is a vertical transverse section through Fig. 1 looking toward the rear of the machine; and Fig. 4 is a rear end elevation of a portion of the machine.

The subject matter of this application is a division of my former application Serial Number 752,550, filed March 7, 1913 for corn silking machines, wherein the same is illustrated and described in its relation to and as a part of a complete machine for removing the silk from cut corn.

Herein, the machine frame 11 is shown as provided with standards 12 and 13 upstanding therefrom at the two ends. These standards are of dissimilar height and serve as bearing supports for the two ends of an inclined shaft 14. Supported by the standard 13 and by a supplemental standard 15 is a trough-like member 16 within which operates a screw conveyer 17 rigidly mounted upon the shaft 14 and above and in open communication with the trough 16 is a feed hopper 18 into which the cut corn is fed by the cutting machines or from any other suitable source of supply. Upon the shaft 14 is fixed a gear wheel 19 having teeth upon its forward face, which teeth are in mesh with a beveled gear 20 carried by a jack shaft 21 driven from any suitable source of power.

Fixed upon the shaft 14 immediately to the rear of the gear 19 by means of a spider bracket 22 is a square plate 23 having a central aperture coinciding longitudinally with the screw conveyer 17, while at the opposite end of the shaft 14 immediately adjacent its bearing in the standard 12 is a spider 24 having four arms. The corners of the plate 23 and the arms of the spider 24 are connected by channel bars 25 which form a box-like frame of which the plate 23 and the spider 24 constitute end frame members, the former closing the upper end of the structure except for a central feed opening and the latter leaving the lower end of the structure substantially open and unobstructed. Upon each of the angle bars 25 near its two ends and also advantageously in its medial portion are mounted clips 26 the central portions of which are secured to the bars while the terminal portions are spaced from said bars, as clearly shown in Figs. 3 and 4. Upon each of the four sides of this rotary box structure is arranged a screen 27, the marginal frame members 28 of which are slidably disposed within the space between the terminal portions of the clips and the angle bars, the upper ends of the screens abutting against the plate 23 and the lower ends thereof terminating near the spider 24 and the lower ends of the angle bars 25.

In order to retain the screens 27 securely in position and at the same time to provide for their ready removal for cleaning purposes a spider 29 is rotatably mounted upon the shaft 14 closely adjacent to the spider 24. The arms of this spider are of less length than the arms of the spider 24 so that when the spider 29 is turned to bring its arms into alinement with the arms of the other spider they will not reach to the angle bars 25 and yet are of sufficient length that when they are turned to a position intermediate the arms of the spider 24 their outer ends will extend to an intersection with the planes of the screens 27. It will thus be seen that in the last mentioned position the screens 27 will rest against the arms of the spider 29 and be retained in position and that when the spider 29 is angularly displaced 45° its arms will be removed from in front of the screens 27 and the latter can be easily slipped from under the clips 26 and removed from the frame.

For the purpose of locking the spider 29 in retaining position I form upon one arm thereof a stop projection 30, the outer end of which abuts against the edge of one of the arms of the spider 24 when in retaining position while a spring catch 31 is mounted upon one of the arms of the spider 24 in such position that its free end will snap into position behind a rib 32 on the spider 29 thus releasably locking the spider 29 in position with its arms engaging the ends of the screens to prevent their displacement.

The frame carried by the shaft 14 and the screens removably mounted upon the four sides of the frame constitute a trommel or tumbling screen which receives from the hopper 18 by means of the screw 17 the cut corn and any bits of silk, cob and other debris coming from the cutting machine. The trommel being constantly rotated, the material is tumbled from one screen to the other and the grains of corn fall through the meshes of the screen while most of the silk, cob and other refuse matter are either held in meshes of the screens or finally discharged at the lower open end of the trommel.

At intervals during the operation of the machine, whenever necessary, the belt shifter (not shown) may be operated to stop the machine permitting the corn to accumulate within the trough 16 while the spider 29 is turned at an angle and the screens 27 slipped out of the trommel and cleansed by dipping in water or substituted by another set of screens held in reserve. It will thus be seen that by reason of the provision of means whereby the machine may be in all of its parts quickly and thoroughly cleansed the operation is practically continuous and it is not necessary to stop the operation of the cutting machines while the silking machine is itself cleansed.

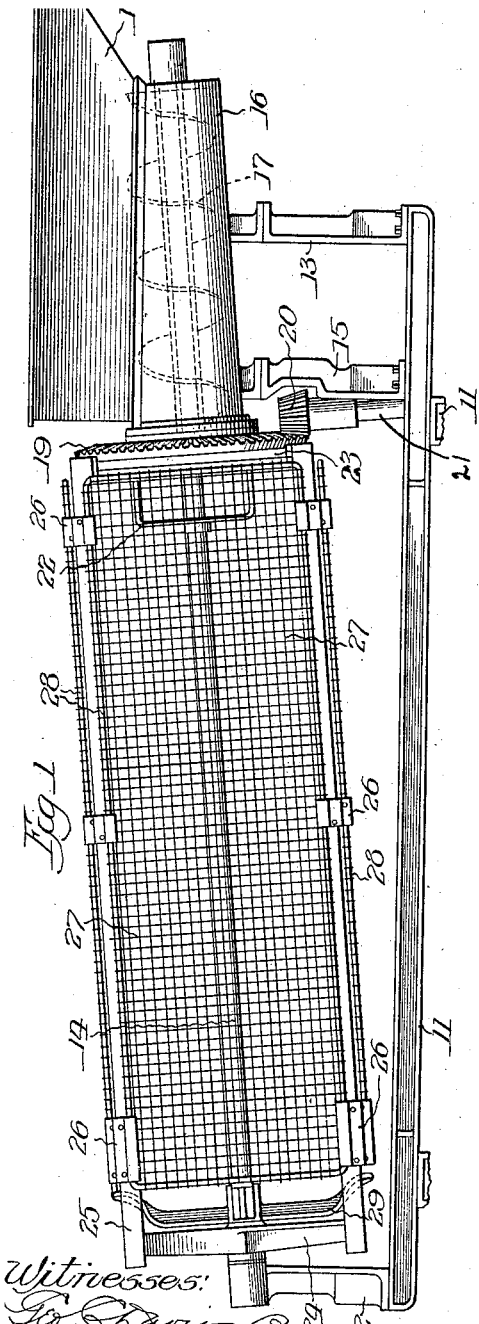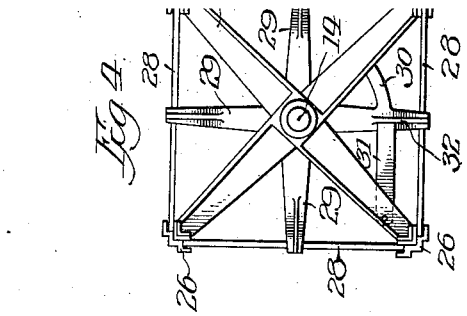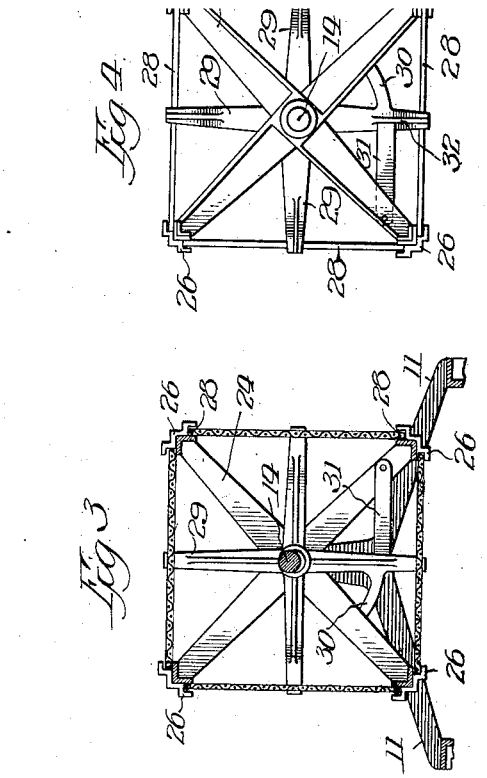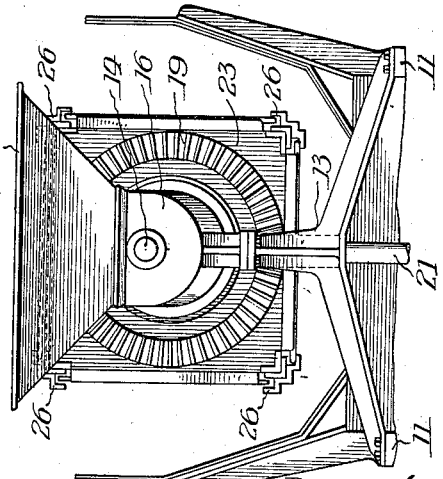

I claim:

1. In a machine of the class described, a trommel including a frame and screens slidable longitudinally with reference to the frame, and common means to retain the screens in position comprising a member adapted to be swung from a position in the path of the slidable screens to a position out of said path, substantially as described.

2. In a machine of the class described, a trommel including a frame with overlying spaced clips, and screens slidable longitudinally of the frame within the clips, a retaining spider rotatably mounted with reference to the trommel axis from a position with its arms engaging the screens to a position out of engagement therewith, and means to lock the retaining spider in engaging position, substantially as described.

3. In a machine of the class described, a trommel comprising a frame including end members, connecting bars and clips, and screens slidable longitudinally of the frame within the clips, a retaining spider rotatably mounted with reference to the trommel axis from a position with its arms in the path of the screen ends to a position out of the path thereof, and a spring catch to lock the retaining spider in engaging position, substantially as described.

4. In a machine of the class described, an inclined trommel comprising a frame including an upper end plate, a lower end spider, connecting bars, clips overlying the bars, screens slidable longitudinally of the frame within the clips, a retaining spider mounted to rotate with reference to the trommel axis from a position with its arms in the path of the screen ends to a position out of the path thereof, a stop carried by one of the spiders and adapted to position the retaining spider in engaging relation to the screens, and a spring catch carried by one of the spiders and adapted to engage the other to lock the retaining spider in engaging position, substantially as described.

5. In a machine of the class described, an inclined trommel comprising a frame including an upper end plate, a lower end spider, and connecting bars, clips carried by the bars in spaced relation thereto, screens slidable longitudinally of the frame within the clips, a retaining spider mounted to rotate upon the shaft adjacent the end spider from a position with its arms in the path of and engaging the screen ends to a position out